US007305652B2

(12) United States Patent
Davis et al.

(10) Patent No.: US 7,305,652 B2
(45) Date of Patent: *Dec. 4, 2007

(54) STANDARD APPLICATION DEVELOPMENT TEMPLATE

(75) Inventors: Jeffrey Michael Davis, Rochester, MN (US); Aneth Leonor Frye, Marietta, GA (US); Robert A. Hoth, Rochester, MN (US); Brian Richard Lepel, Rochester, MN (US); Randy Eugenio Oyarzabal, Kasson, MN (US); Nathan Gary Steffenhagen, Eau Claire, WI (US)

(73) Assignee: International Business Machines Corporation, Armonk, NY (US)

( * ) Notice: Subject to any disclaimer, the term of this patent is extended or adjusted under 35 U.S.C. 154(b) by 635 days.

This patent is subject to a terminal disclaimer.

(21) Appl. No.: 10/798,906

(22) Filed: Mar. 11, 2004

(65) Prior Publication Data

US 2005/0204339 A1 Sep. 15, 2005

(51) Int. Cl.
*G06F 9/44* (2006.01)
(52) U.S. Cl. ............... 717/100; 717/106; 717/109; 715/506
(58) Field of Classification Search ........... 717/101, 717/106, 107, 114–118, 120, 159, 162–164, 717/100, 109; 715/506
See application file for complete search history.

(56) References Cited

U.S. PATENT DOCUMENTS

| | | | | |
|---|---|---|---|---|
| 5,671,415 A | * | 9/1997 | Hossain | 717/101 |
| 5,860,004 A | * | 1/1999 | Fowlow et al. | 717/109 |
| 5,970,252 A | * | 10/1999 | Buxton et al. | 717/166 |
| 6,263,352 B1 | * | 7/2001 | Cohen | 715/513 |
| 7,111,231 B1 | * | 9/2006 | Huck et al. | 715/513 |
| 2001/0047402 A1 | * | 11/2001 | Saimi et al. | 709/219 |
| 2002/0080200 A1 | * | 6/2002 | Wong et al. | 345/969 |
| 2003/0221184 A1 | * | 11/2003 | Gunjal et al. | 717/118 |
| 2003/0233631 A1 | * | 12/2003 | Curry et al. | 717/100 |

OTHER PUBLICATIONS

Peter Fingar, "Component-Based Frameworks for E-Commerce", 2000, Communications of the ACM, vol. 43, Issue 10, pp. 61-66.*
Jia Zhang and Ugo Buy, "A Framework for Efficient Production of Web Applications", 2003, Proceedings of the Eighth IEEE International Symposium on Computers and Communications (ISCC '03).*

* cited by examiner

*Primary Examiner*—Thomas Lee
*Assistant Examiner*—Jue S Wang
(74) *Attorney, Agent, or Firm*—Patterson & Sheridan LLP (57) ABSTRACT

Methods, systems and articles of manufacture are provided for organizing, managing and utilizing standard development templates and framework components in an application development environment. Functionality provided by embodiments of the present invention allows developers to develop applications more efficiently and cost effectively.

23 Claims, 7 Drawing Sheets

STANDARD APPLICATION DEVELOPMENT TEMPLATE

BACKGROUND OF THE INVENTION

1. Field of the Invention

The present invention generally relates to data processing and more particularly to the use of templates and frameworks for application development.

2. Description of the Related Art

During application development, there is often an opportunity to reuse code that has been previously implemented. Reuse of implemented code is advantageous because the code is already created, unit tested and validated. Further, the code has probably undergone rigorous integration testing and systems testing prior to being implemented in a production environment. For the foregoing reasons, it can be appreciated that it is desirable to reuse code during the application building process.

One manner in which code can be reused is by utilizing standard development templates. The basic principal of a standard development template is that a collection of high quality components is copied (from a design perspective) over and over again to create new instances of components. The newly instantiated components, with certain standard functionality already provided, become the foundation of a new application. Adding on to the existing code, or modifying the existing code as required can provide additional functionality needed per the requirements of the particular application being developed.

In an application development environment numerous standard development templates may exist. For example, if three different types of applications are being developed (e.g., document management, process workflow and mail services) in a particular environment, three different standard development templates may be used to serve as a foundation on which the three different types of application can be built.

Application development efficiency can be further enhanced if the components that make up the standard development template leverage framework components. Framework components are standard components that are organized based on functionality and placed into libraries. Framework components may comprise front-end (user interface) based components such as graphic user interface (GUI) window elements including buttons and menus. Framework components may also comprise back-end components such as a file IO class and security class. The framework components may be accessible to the entire development environment and made available to all the standard development templates.

An example of a development environment that can benefit from the use of standard development templates and core components is the Lotus Notes® development environment, a product available from International Business Machines of Armonk, N.Y. Lotus Notes® is used to develop applications (also referred to as projects) that solve particular business problems. Each project contains design elements or components such as forms, views, shared actions and agents. When the development of a new project begins, the development process is made more efficient via the use of standard development templates and framework components. However, developers and administrators face a difficult and cumbersome task in organizing, managing and using standard development templates and framework components.

Therefore, there is a need for methods and systems for organizing and managing standard development templates for use in application development. Preferably, the methods and systems will facilitate efficient implementation of standard development templates and core components and improve the efficiency of the application development environment.

SUMMARY OF THE INVENTION

The present invention generally relates to methods, apparatus and articles of manufacture for organizing, managing and utilizing standard development templates and framework components in an application development environment.

One embodiment provides a standard application development template residing in a computer-readable medium and configured to facilitate application development. The standard application development template generally includes a plurality of front-end templates and at least one back-end template configured for specifying background processes of the application under development, the back-end template including at least one template agent. The plurality of front-end templates are configured for specifying user interface elements of an application under development, the front-end generally include at least one of each of: a template form, a template view, and a template shared action.

Another embodiment provides a standard application development template residing in a computer-readable medium and configured to facilitate application development. The standard application development template generally includes a) a plurality of front-end templates configured for defining user interface elements of an application under development, and b) a plurality of back-end templates configured for defining background processes of the application under development, wherein each of the plurality of templates is user-selectable and configured to be augmented with user-selected, project-specific elements.

Another embodiment provides a computer implemented method of using a standard application development template generally including providing front-end templates including at least template forms, template views and template shared actions, providing one or more back-end template components including at least template agents, generating a form from the template forms, generating a view from the template views, generating a shared action from the template shared actions, generating an agent from the template shared agent, and combining the generated form, view, shared action and agent to define an application.

Another embodiment provides a computer implemented method of using a standard application development template generally including providing templates configured to provide standard functionality facilitating document management; wherein the templates include front-end templates configured for defining user interface elements of an application under development and back-end templates configured for defining background processes of the application under development and generating document management applications using the template components.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope for the invention may admit to other equally effective embodiments.

DETAILED DESCRIPTION OF THE PREFERRED EMBODIMENTS

The present invention is generally directed towards providing a system and article of manufacture for organizing, managing and utilizing standard development templates and framework components in an application development environment. Functionality provided by the present invention enables developers to develop applications more efficiently and cost effectively.

Embodiments of the present invention may be used to develop a wide variety of applications may be used in many different industries. Examples of such applications include, but are not limited to document management, process workflow and mail services. Advantages of using a system based on standard development templates include reusability, traceability, and standardization all of which may result in reduced cost, shortened development cycle, and increased quality.

Aspects of the inventions may be embodied on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the programs executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the context for which they are implemented in a specific embodiment of the invention. However, it should be appreciated that any particular programming nomenclature that follows is used merely for convenience, and thus the invention should not be limited to use solely in any specific application identified and/or implied by such nomenclature.

In one aspect, the invention is particularly advantageous in the context of highly modular languages such as object-oriented programming languages including the JAVA® and C++ programming languages. However, the use of object-oriented terminology is merely for convenience or illustration, and not limiting of the invention. Further, in some cases, different terms are used for the same or similar aspects of the invention. For example, in the claims appended below, the term "application", "routine" or "function" may be used as a generic substitute for the term "method" to avoid any suggestion of that the invention is limited to particular object-oriented programming languages.

As used herein, the term application generally refers to a set of coded instructions that enable a computer to perform a specified operation. Projects, programs, functions, plug-in components, analysis routines, or modules among other terms may constitute applications. Further, applications may be implemented internally or externally to a system, while remaining accessible by that system. While the following description and examples focus on applications implemented in a Lotus Notes® environment, those skilled in the art will recognize the methods described herein may also be used in other well known programming environments including object oriented programming environments.

As used herein, the term user may generally apply to any entity utilizing the application development system described herein, such as a person (e.g., an individual programmer or developer) interacting with an application program or an application program itself, for example, performing automated tasks. While the following description may often refer to a graphical user interface (GUI) intended to present information to and receive information from a person, it should be understood that in many cases, the same functionality may be provided through a non-graphical user interface, such as a command line and, further, similar information may be exchanged with a non-person user via a programming interface.

As used herein, the term leverage may generally be used to describe the implementation of functionality in one object by its reference to attributes and functionality provided by another object. For example, if object B leverages object A, object B refers to particular attributes and metadata of object A and implements particular functionality available in object A. Methods and systems according to one embodiment of the invention are implemented in an object oriented development environment where the term leverage, as used herein, generally refers to the concept of inheritance. As understood by those skilled in the art, inheritance provides a means by which one object can inherit the state and behavior of another object. Further inheritance provides a powerful mechanism for organizing and structuring software programs.

Figure 1:
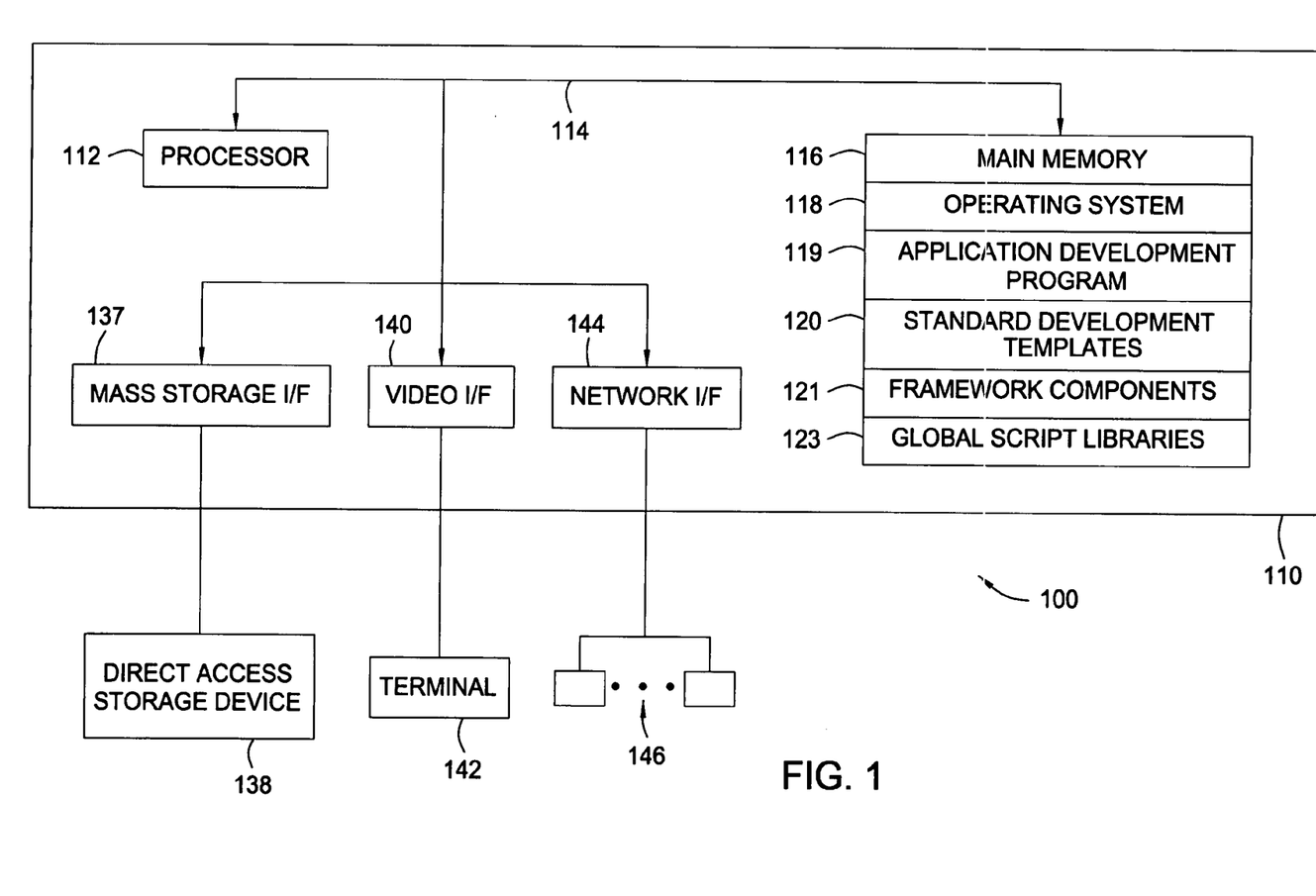
FIG. 1 is a high-level diagram of a networked computer system, according to one embodiment of the present invention.

Referring now to FIG. 1, a computing environment 100 according to one embodiment of the invention is shown. In general, the distributed environment 100 includes a computer system 110 and a plurality of networked devices 146. For simplicity, only the details of the computer system 110 are shown. However, it is understood that the computer system 110 may be representative of one or more of the networked devices 146. In general, the computer system 110 and the networked devices 146 could be any type of computer, computer system or other programmable electronic device, including desktop or PC-based computers, workstations, network terminals, a client computer, a server computer, a portable computer, an embedded controller, etc.

Although shown networked into a larger system, the computer system 110 may be a standalone device. Moreover, those skilled in the art will appreciate that embodiments may be practiced with other computer system configurations including hand-held devices, multiprocessor systems, microprocessor-based or programmable consumer electronics, minicomputers, mainframe computers and the like. In a particular embodiment, the computer system 110 is an eServer® iSeries® 400 computer available from International Business Machines, Corporation of Armonk, N.Y. The embodiment may also be practiced in distributed computing environments in which tasks are performed by remote processing devices that are linked through a communications network. In a distributed computing environment, program modules may be located in both local and remote memory storage devices. In this regard, the computer system 110 and one or more of the networked devices 146 may be thin clients that perform little or no processing, but are coupled to a remote system that does the processing.

The computer system 110 could include a number of interfaces and peripheral systems as shown, for example, by a mass storage interface 137 operably connected to a direct access storage device 138, by a terminal interface 140 operably connected to a terminal 142, and by a network interface 144 operably connected to the plurality of networked devices 146. The terminal 142 may be any video output device for outputting viewable information.

Computer system 110 is shown comprising at least one processor 112, which obtains instructions, or operation codes (also known as opcodes), and data via a bus 114 from a main memory 116. The processor 112 could be any processor adapted to support the application development methods, apparatus and article of manufacture of the invention. Illustratively, the processor may be selected from one of the Power® family of processors available from International Business Machines Corporation of Armonk, N.Y.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in a computer system 110, for example, any storage capacity used as virtual memory on a mass storage device or storage capacity on another computer coupled to the computer system 110 via bus 114 or network interface 144.

Computer system 110 may also comprise features directed to application development including an application development program 119, standard development templates 120, framework components 121, and global script libraries 123. As will be described in more detail below, application development is facilitated via the use of standard development templates. Standard development templates, in turn, leverage functionality provided by framework components 121. Framework components may also leverage functionality provided by global script libraries 123. The application development process flow by which standard development templates 120, framework components 121 and global script libraries 123 are leveraged is generally referred to as the framework process. Each of these components and the framework process will be described in more detail during the discussion of FIG. 2 and FIG. 3.

Figure 2:
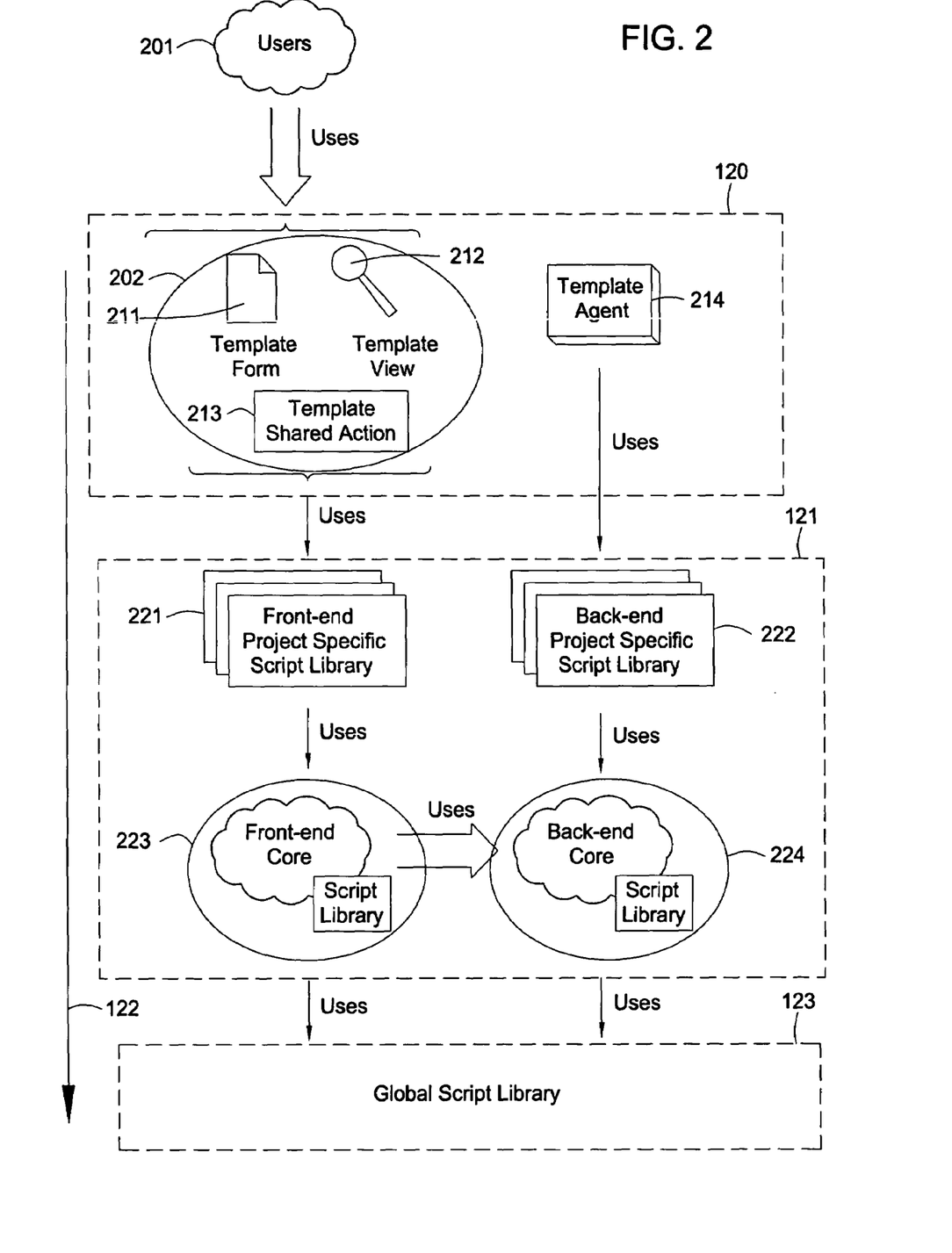
FIG. 2 is a conceptual block diagram illustrating a logical model of a standard development template, framework components and framework process according to one embodiment of the current invention.

FIG. 2 illustrates a logical model of the standard development template, framework components and framework process according to one embodiment of the invention. The logical model comprises the standard development template 120, framework components 121, a framework process 122, and a global script library 123.

As the name implies, the standard development template 120 includes components that can be used as a template from which new objects can be created for use in the building of applications. The standard development template is a collection of front-end component templates and back-end component templates. As stated above, embodiments of the current invention can be implemented in a Lotus Notes® development environment. In a particular embodiment implemented in a Lotus Notes® environment, applications comprise front end components and back end components. Front-end components include GUI components and back-end components include implementations not seen directly by the user (i.e., background processes).

In the depicted embodiment of FIG. 2, the front-end components of the standard development template 120 include a template form 211, template view 212 and template shared action 213 and the back-end components include a template agent 214. Forms (created using the template form 211) are design elements that accommodate the entering and retrieving of information from a system such as Lotus Notes®. Forms can be used to create documents and manage the data within documents. In some embodiments, forms can be used to create an interface through which database queries can be built and submitted. Views (created using the template view 212) are elements that provide a summarized view of data. For instance, in the Lotus Notes environment, views may provide a list of documents in a database that are usually sorted or categorized to make finding documents easier. Multiple views may be utilized to summarize and present the data residing in a database. Shared actions (created using the template shared action 213) are core elements of any object, such as a form. For example, when a user clicks a button on a form, a task is performed, such as closing the form or submitting data within the form to the database. Agents (created using the template agent 214) may be implemented as functions that execute an action or set of actions and may be configured to run as a background process. Agents may also be configured to interact with multiple applications. Illustrative actions performed by agents include: automatically removing outdated documents in a database, or processing a group of documents in batch mode at the end of a business day.

In some embodiments, the template components copied from the standard development template 120 provide basic functionality that can be utilized by multiple applications, but may not provide all the functionality that is needed. Additional functionality may be obtained by leveraging framework components 121.

In one embodiment, framework components 121 include a front-end project specific script library 221, a back-end project specific script library 222, a front-end core script library 223 and a back-end core script library 224. The front-end project specific script library 221 may include a collection of components directed to the user interface of applications. As indicated by their names (i.e., those denoted as "project specific"), some of the components are unique to a specific project, but other components (i.e., those denoted as "core") leveraged from the front-end core script library 223 and back-end core script library 224 may be usable by a multiple projects. Framework components are described in more detail during the discussion of FIG. 4.

The front-end core script library 223 may include components based on GUI elements such as fields and prompts. The back-end core script library 224 may include components that provide infrastructure based services such as messaging and logging. Both the front-end core script library 223 and back-end core script library 224 may leverage data structures available in a global script library 123.

Global script libraries 123 are typically meant to contain global declarations and data structures that are commonly needed in most routines. Examples of global script library 123 components would be declarations for Lotus Notes Document structures or Lotus Notes View structures.

An application building process performed using the standard development template 120 to leverage framework components which in turn leverage the global script library 123, is generally defined as the framework process 122. The framework process 122 is described in more detail below.

Figure 3:
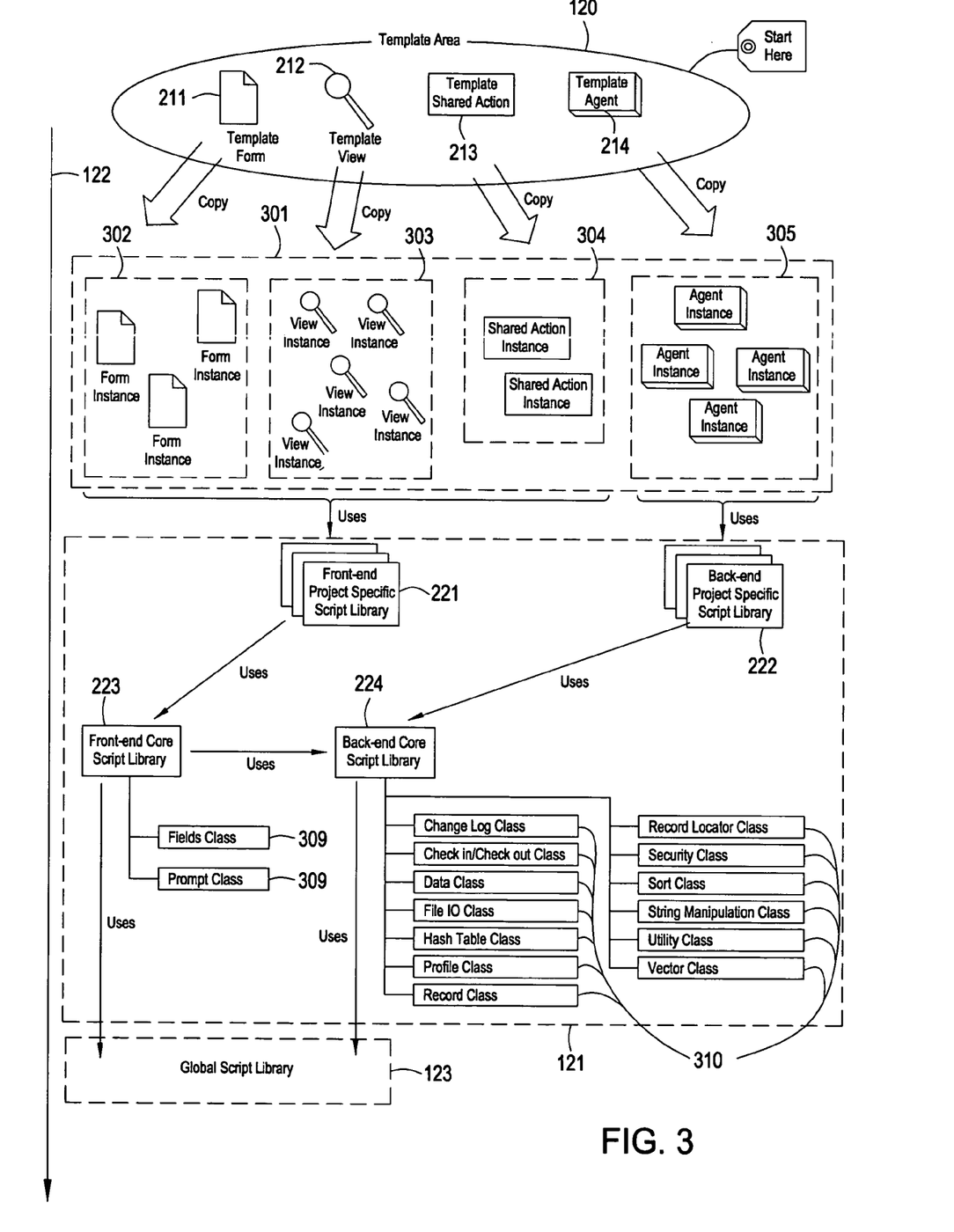
FIG. 3 is a conceptual block diagram illustrating a physical model of a standard development template, framework components and framework process according to one embodiment of the current invention.

FIG. 3 is a conceptual block diagram illustrating a physical model of a standard development template, framework components and framework process according to one embodiment of the current invention. It should be noted that the physical model shown in FIG. 3 directly corresponds to the logical model illustrated in FIG. 2. In addition to illustrating the components of a template, FIG. 3 also provides a high-level view of the framework process 122 by which a standard development template leverages framework components 121, which in turn leverages the global script library 123.

Accordingly, FIG. 3 shows a detailed view of the standard development template 120, template components 211-214, and instantiated components 302-305. A detailed view of the framework components 121 includes a front-end project specific script library 221 and back-end project specific script library 222. Also shown among the framework components 121 are a front-end core script library 223 and back-end core script library 224. Finally, a global script library 123 is shown at the bottom of FIG. 3. It should be noted that FIG. 3 illustrates elements according to one embodiment of the invention and may not show elements of other embodiments. A discussion of the elements listed follows.

The template components included in the standard development template 120 can be instantiated (or copied) and will provide a foundation from which project specific versions can be created. The individual form instances 302, view instances 303, shared action instances 304, and agent instances 305 collectively define a new application 301 being developed. The application 301 includes these components to provide specific functionality. The developer has chosen to create specific instances of forms, views, shared actions and agents for the application by copying the appropriate template components from the standard development template 120. In this example, the new application 301 has three forms. In order to develop the forms, the developer leverages the standard development template 120 and copies the template form 302. This copy may contain standard functionality found in forms including, for example, menus, and buttons such as OK and CANCEL. The developer may now add to the form any other required functionality.

As with the discussion of forms above, the same process is repeated for views, shared actions and agents. In the current example, the developer needs five views, and accordingly, has created five view instances 303 by leveraging the template view 212. Similarly, two shared action instances 304 were created based on template shared action 213, and four agent instances 305 were created based on template agent 214.

Also as described above, the developer may need to add functionality to each of the new instances according to requirements of the current application. In order to add the additional functionality, framework components 121 can be leveraged. In particular the front-end project specific library 221 and the back-end project specific library 222 can be leveraged. The forms, views, shared actions and agents from the example make direct use of the front-end project specific script library 221 and back-end project specific script library 222. Project specific libraries are logical groupings of implementations utilized in a particular project, where the front-end project specific script library 221 is directed towards components of the user interface; the back-end specific script library 222 is directed towards implementations not directly viewable by the user.

As described above, the components of the application may need to provide a wide variety of core functionality in addition to the project specific functionality. Accordingly, the front-end core script library 223 and back-end core script library 224 include a plurality of front-end components 309 and back-end components 310. For example, suppose one of the forms 302 in the user interface has a requirement to track when the document is saved. Rather than write custom code to track document save history, the developer can leverage the functionality provided by the Change Log class of the classes 310 which is a component of the back-end core script library 224. Similarly, any of the front-end components 309 or back-end components 310 belonging to the front-end core script library 223 and back-end core script library, respectively, can be leveraged during application development. In turn, these core libraries may leverage global script libraries 123 in order to reuse commonly needed data structures and declarations. Table 1 provides a brief description of each of the classes belonging to the front-end core script library 223 and back-end core script library 224 in FIG. 3.

TABLE 1

| CLASS | DESCRIPTION |
| --- | --- |
| Field | A module in a form used to present and manage data. |
| Prompt | A module used with a text field for entering a value. |
| Change Log | A module used for managing application logs. |
| Check in/Check out | A module used to facilitate document management. |
| Data | A module used to manage data. |
| File IO | A module used to manage file input and output transactions. |
| Hash Table | A module used to manage hash tables. |
| Profile | A module used to manage document attributes. |
| Record | A module used to manage database records. |
| Record Locator | A module used to facilitate database queries. |
| Security | A module used to provide and manage application security. |
| Sort | A module used to manage data presentation. |
| String Manipulation | A module used to manipulate text. |
| Utility | A module used to provide utilities useful during application development. |
| Vector | A module used to manage vector processing. |

Figure 4:
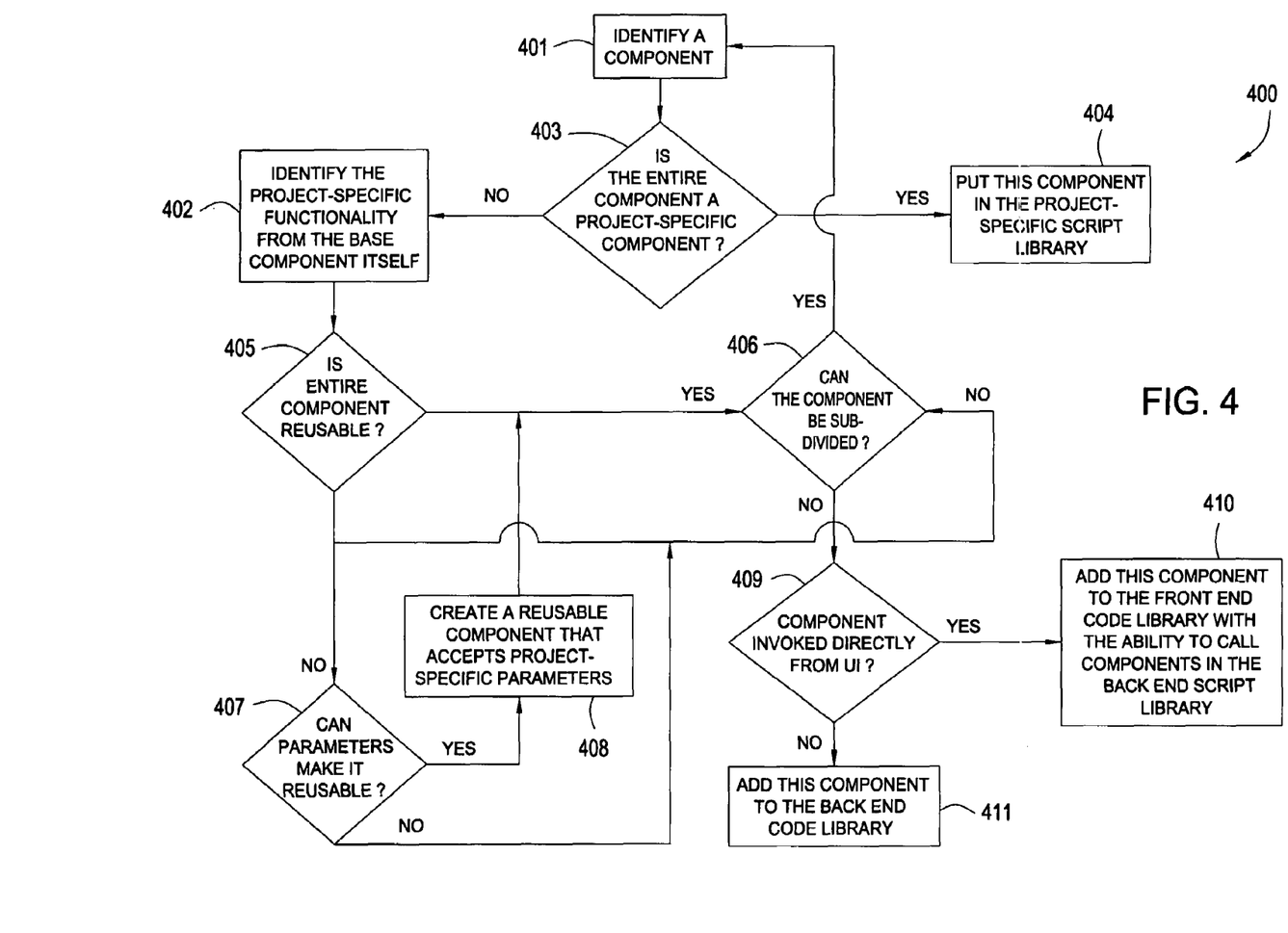
FIG. 4 is a flow chart illustrating exemplary operations for organizing framework components.

The effectiveness of using the framework process 122 for building applications relies on the organization and availability of framework components 121. FIG. 4 is a flow chart illustrating exemplary operations for organizing and maintaining framework components. The operations 400 outline the steps used to integrate existing components into the collection of framework components 121 so that it can be leveraged during the building of new applications.

Operations 400 begin at step 401 when a developer identifies a component to be reusable and desires it to be integrated into the framework components 121. A piece of code is considered reusable if the functionality provided by the code can be utilized in multiple applications. As discussed with reference to FIG. 3, framework components are organized in a front-end project specific script library 221, a back-end project specific script library 222, a front-end core script library 223 and back-end core script library 224. At step 402 it is determined whether the entire component is a project specific component. It should be understood that components may comprise other components. A program, for example, can contain other modules of code such as functions. If the developer determines that the entire component is not suitable for use in other projects, the component is placed in the appropriate project specific script library at step 404. However, if it is found at step 402 that the entire component is not project specific, at step 403 the portion of the component that is project specific is identified.

Next, at step 405 it is determined if the entire component is reusable. If the entire component is deemed to be reusable, at step 406 it is determined if the component can be subdivided or separated into two or more self-contained components. For example, if a particular component is a program, at step 406, it is determined if the program can be broken down into two or more subprograms. If the component can be further subdivided, operations 400 are repeated for each subdivided portion of the component. If the component can not be subdivided, at step 409 it is determined if the component can be invoked from the user interface (UI). In other words at this step it is determined if the component is a front-end component or a back-end component. If the component is a front-end component, it is placed in the front-end script library at 410. Otherwise, it is placed in the back-end script library at step 411.

Referring back to step 405, if it is determined that the entire component is not reusable, at step 407 it is determined if modifying the component to use parameters can make it reusable. Generally, the use of parameters aid in modularizing code so that it can be used in multiple applications. If step 407 is answered negatively, the process flow commences to step 406. However, if it is possible to utilize parameters to make the component reusable, at step 408 a new component is created (replacing the original component identified at step 401) to accept project specific parameters. Next, the process flow is continued from step 406.

In one embodiment, each of the components belonging to the front-end project specific script library 221 and back-end project specific script library 222, front-end core script library 223 and back-end core script library 224 is unique. In other words, a component can belong to only one of these libraries. Each particular component is maintained in only one library to effectively manage code and avoid version control problems among other types of problems understood by those skilled in the art.

Figure 5:
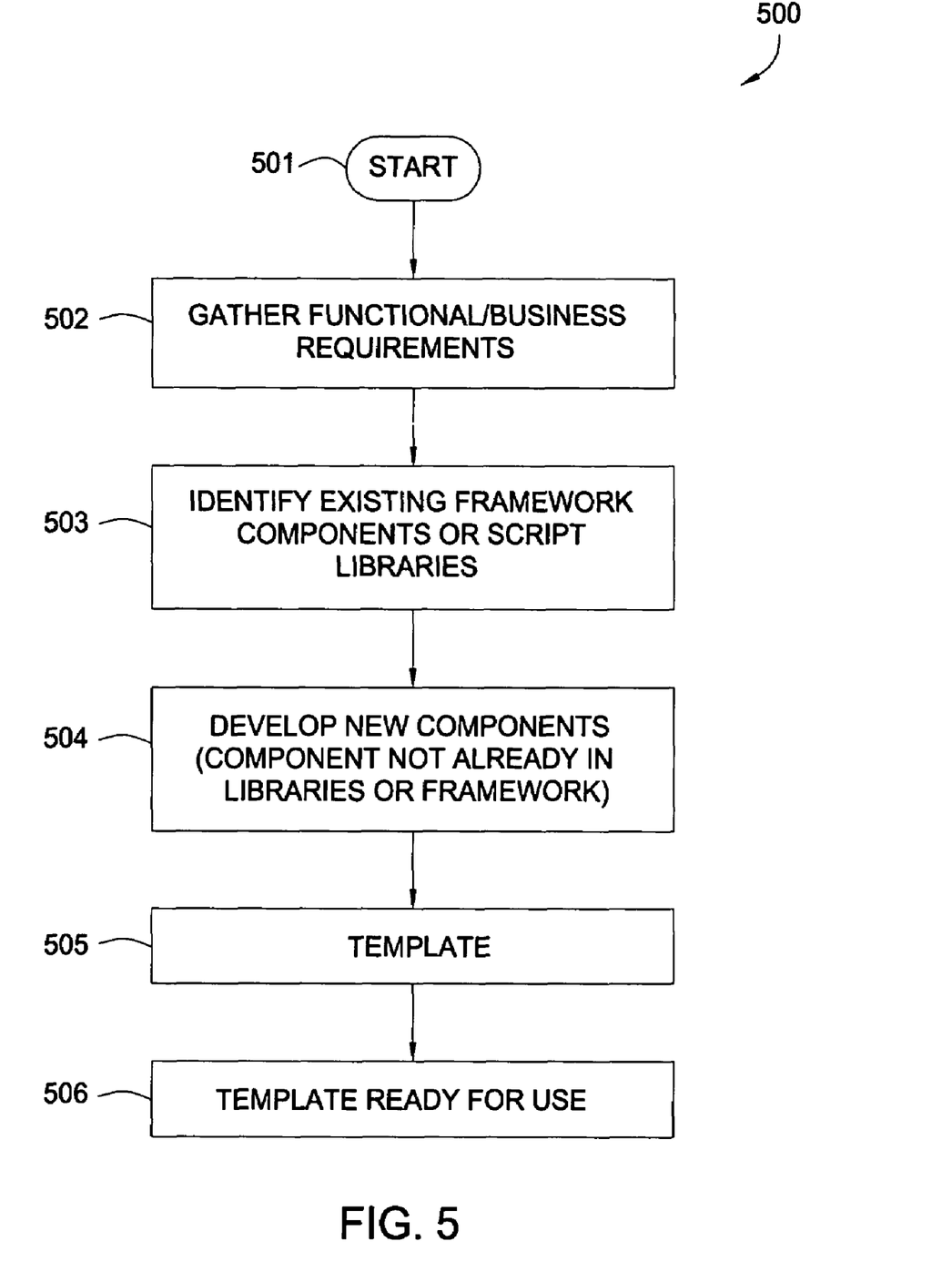
FIG. 5 is a flow chart illustrating exemplary operations for creating and maintaining a standard development template.

In addition to the organization and availability of framework components 121, the framework process 122 also relies on a properly constructed standard development template. FIG. 5 is a flow chart illustrating exemplary operations for creating a standard development template. Standard development templates 120 were discussed above with reference to FIG. 2 and FIG. 3.

Operations 500 begin at step 501 when the need for a standard development template 120 is established. For example, a development team may have determined that several applications addressing similar business problems are going to be developed. Therefore, it would be advantageous to construct a standard development template 120 comprising components that provide the common functionality. Once built, the standard development template 120 will provide a foundation from which to begin developing the application.

At step 502 business requirements (or functional requirements) are gathered for the standard development template 120. Keeping in mind that the template is going to be used to create new applications that are configured for solving particular types of business problems, the basic requirements of the business problems are identified. For example, if the current standard development template 120 is going to be used to build content management based applications, some components the template might include are particular types of forms, views, shared actions, agents. One of the form templates, for example, may be designed to be used to build and submit queries related to content management.

Next, at step 503 particular framework components 121 are identified as candidates for components to be leveraged in the standard development template 120. Further, the global script library 123 is also checked for components that may provide the desired functionality.

It is possible that the desired functionality is not provided by any existing components belonging in either the framework components 121 or global script library 123. In this case, at step 504 new components are developed to provide the needed functionality. Once developed and tested, these components are added to the standard development template 120.

At step 505 the creation of the standard development template is completed by associating all appropriate framework components 121, global script library components 123 and newly developed components. Finally, at step 506 the standard development template is made available for use by application developers.

Figure 6A:
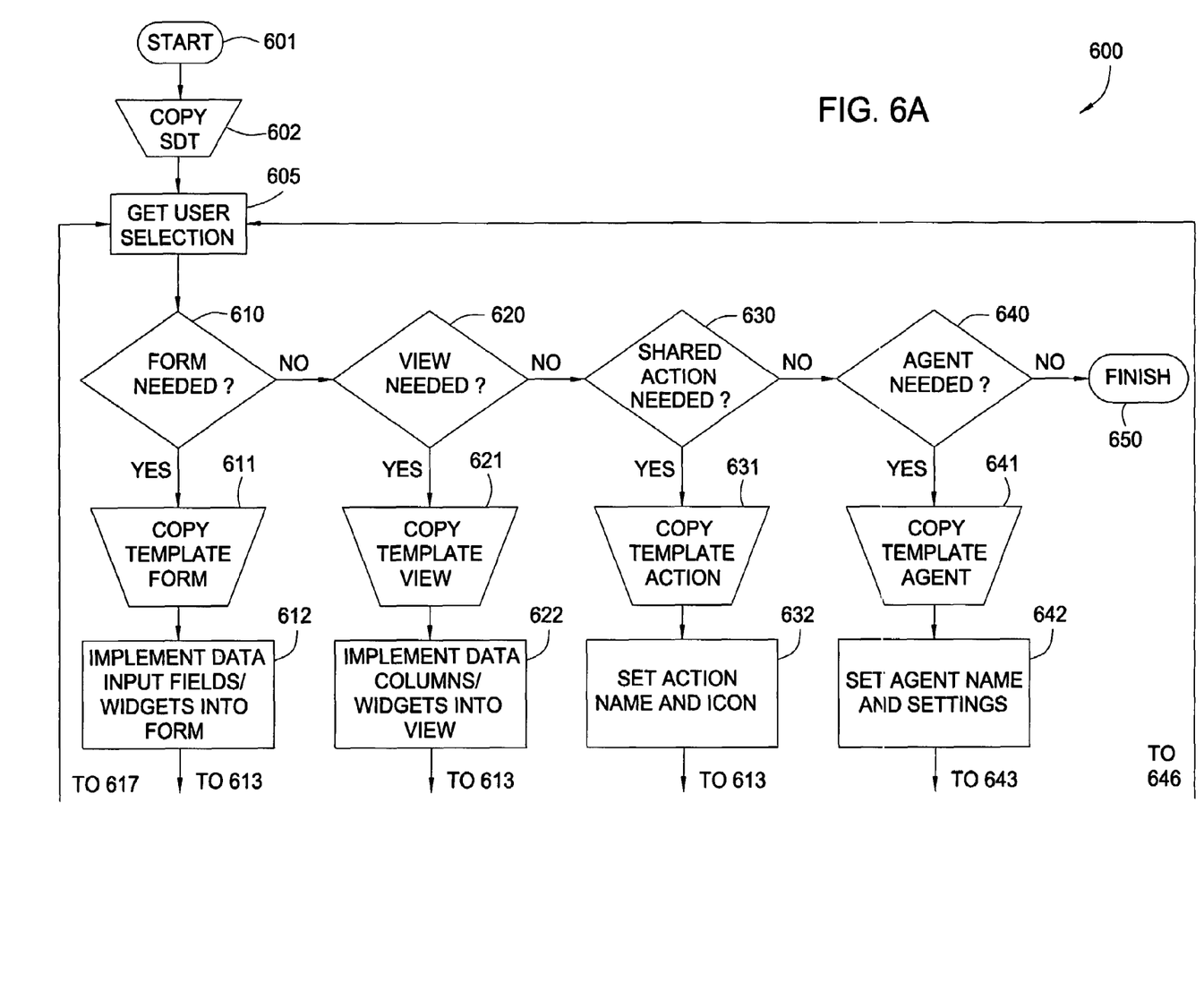
FIG. 6 is a detailed flow chart illustrating exemplary operations for utilizing a standard development template.
Figure 6B:
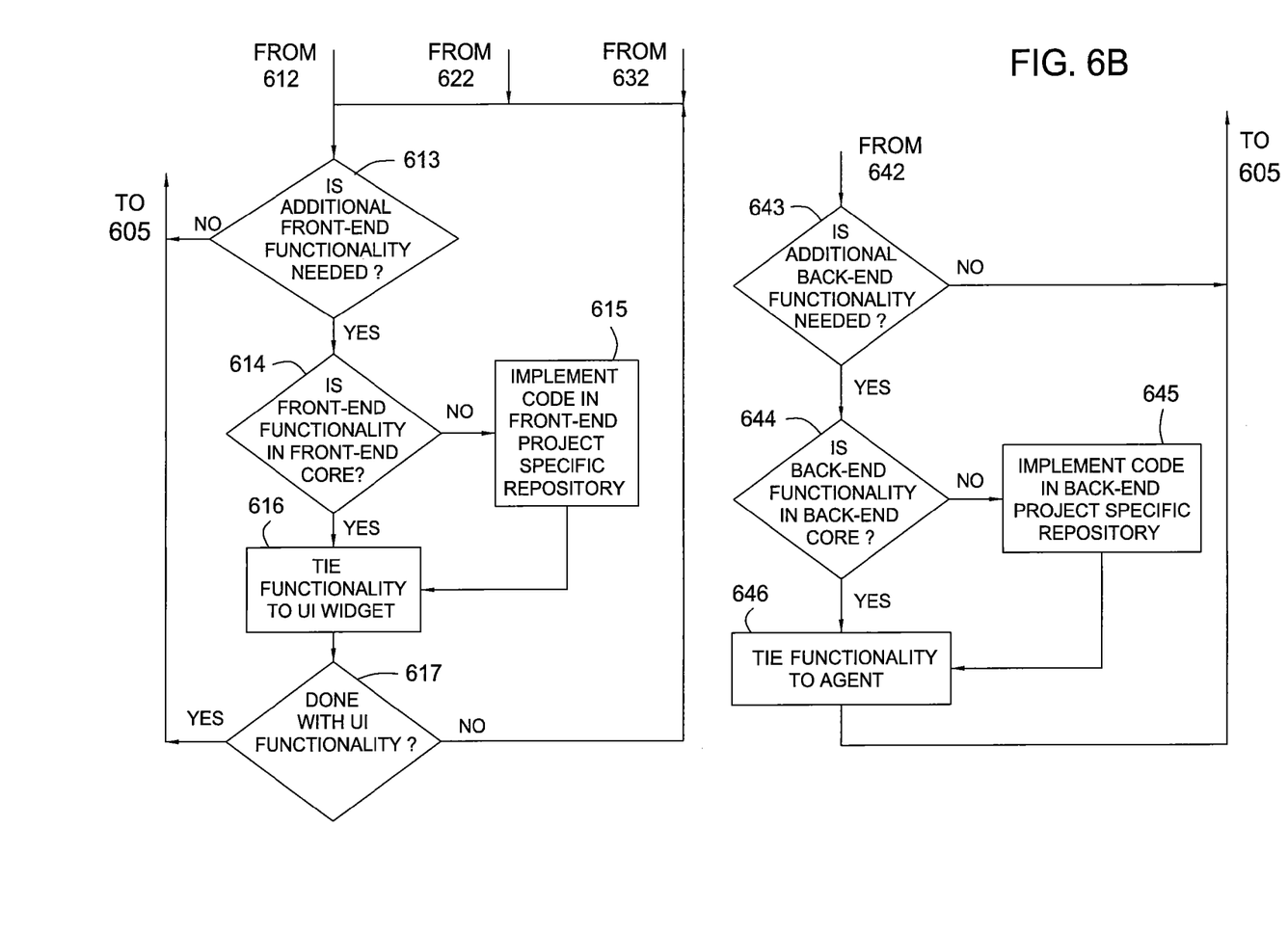

FIG. 6 is a detailed flow chart illustrating exemplary operations 600 describes the framework process 122. The operations 600 begin at step 601 when a suitable standard development template 120 is identified. For example, in a GUI environment, a plurality of objects representing standard development templates might be presented to a developer. The developer would then select the most appropriate standard development template 120 based on requirements of the particular business problem being addressed. Once selected, the standard development template 120 is copied at step 602. Once copied, an instance of the standard development template 120 will serve as a foundation on which the new application 301 will be built.

As described earlier, specific types of components including forms, views, shared actions and agents may be needed for the new application 301. Accordingly, at step 605 the type of component selected by the user is determined. At steps 610, 620, 630, and 640, the appropriate type of component (per the selection of step 605) is identified. At steps 611, 621, 631 and 641 the respective components are copied and at steps 612, 622, 632, and 642 the components are configured and implemented for use in the application 301.

Again, it should be noted that forms, views, and shared actions are generally considered front-end components and agents are considered back-end components. At step 613, for the front-end components that have been implemented, it is determined if additional functionality is needed. If additional functionality is not needed, the next component is processed starting at step 605. However, if additional functionality is needed, a loop of operations (613-617) is entered. At step 614 a check is performed to determine if the desired functionality is provided by any existing components in the front-end core script library 223. If the functionality is not available, at step 615 the code is developed, tested, and placed in the front-end project specific script library 221. In one embodiment, developing the front-end project specific script library 221 is described above with reference to FIG. 4. At step 616 the functionality is associated with the current user interface component. At step 617 it is determined if all required user interface related functionality is implemented in the component. If additional functionality is needed, processing continues from step 613 to 617 in order to leverage additional front-end script library 221 components. Otherwise, the next user selection is processed starting at step 605.

Recall that agents are considered back-end components and accordingly following the creation of an agent from a template agent (640, 641, 642) it is determined at step 643 whether additional back-end functionality (not provided by the standard development template 120) is needed. If additional functionality is needed, at step 644 a check is performed to determine whether components providing the desired functionality exist in the back-end core script library 224 or global script library 123. If a suitable component is not found, new code is developed, tested and placed in the back-end project specific script library 222. In one embodiment, development of such new components is described with reference to FIG. 4. At step 646 the functionality is associated with the current back-end component. Upon completion of step 646 the next component is processed.

It should now be evident that the utilization of standard development templates 120, framework components 121 and global script libraries 123 via the framework process 122 can provide tremendous improvements in efficiency in an application development environment. While the examples described above, with reference to FIGS. 1-6, are based on a Lotus Notes® environment, those skilled in the art will appreciate that the methods, systems and architectures described herein can be used in other application development environments.

While the foregoing is directed to embodiments of the present invention, other and further embodiments of the invention may be devised without departing from the basic scope thereof, and the scope thereof is determined by the claims that follow.

What is claimed is:

1. A standard application development template residing in a computer-readable storage medium and configured to facilitate application development, the standard application development template comprising:
    a plurality of front-end templates configured for specifying user interface elements of an application under development, the front-end templates including at least one of each of:
        a template form;
        a template view; and
        a template shared action;
    at least one back-end template configured for specifying background processes of the application under development, the back-end template including at least one template agent; and
    an application development program configured to:
        receive a selection of at least one of the plurality of front-end templates and at least one back-end template,
        generate an application-specific copy of the selected front-end templates and back-end templates, and
        integrate the application-specific copy of the selected front-end templates and back-end templates to the application under development.

2. The standard application development template of claim 1, wherein the template form provides functionality directed to presenting and managing data.

3. The standard application development template of claim 1, wherein the template view provides functionality directed to presenting database records.

4. The standard application development template of claim 1, wherein the template shared action provides functionality directed to coordinating transactions among different components of an application.

5. The standard application development template of claim 1, wherein the template agent provides functionality directed to execute and manage transactions running as background processes.

6. The standard application development template of claim 1, wherein the template form provides functionality directed to presenting and managing data; wherein the template view provides functionality directed to presenting database records; and wherein the template shared action provides functionality directed to coordinating transactions among different components of an application.

7. The standard application development template of claim 6, wherein the template agent provides functionality directed to execute and manage transactions running as background processes.

8. A standard application development template residing in a computer-readable storage medium and configured to facilitate application development, the standard application development template comprising:
    a) a plurality of front-end templates configured for defining user interface elements of an application under development including at least one of each of:
        a template form,
        a template view, and
        a template shared action; and
    b) a plurality of back-end templates configured for defining background processes of the application under development the back-end template including at least one template agent;
    wherein each of the plurality of templates is user-selectable and configured to be augmented with user-selected, project-specific elements; and
    an application development program configured to:
        receive a selection of at least one of the plurality of front-end templates and at least one back-end template,
        generate an application-specific copy of the selected front-end templates and back-end templates, and
        integrate the application-specific copy of the selected front-end templates and back-end templates to the application under development.

9. The standard application development template of claim 8, wherein the front-end templates include at least one of:
    form templates configured for managing data;
    view templates configured for presenting database records; and
    shared action templates configured for coordinating transactions among different components.

10. The standard application development template of claim 8, wherein the back-end templates include agents configured to manage actions running as background processes.

11. A computer implemented method of generating a software application using an application development template comprising:
providing front-end templates including at least template forms, template views and template shared actions;
providing one or more back-end template components including at least template agents;
receiving a selection of at least one of the front-end templates and at least one of the back-end templates to include in the software application:
generating a form from the selected template forms;
generating a view from the template selected views;
generating a shared action from the selected template shared actions;
generating an agent from the selected template shared agents; and
combining the generated form, view, shared action and agent to generate the software application.

12. The computer implemented method of claim 11, wherein generating the form from the template forms comprises:
selecting a specific template form from the template forms; and
specifying particular user interface functionality to be leveraged.

13. The computer implemented method of claim 11, wherein generating the view from the template views comprises:
selecting a specific template view from the template views; and
specifying particular database record presentation functionality to be leveraged.

14. The computer implemented method of claim 11, wherein generating the shared action from the template shared action comprises:
selecting a specific template shared action from the template shared actions; and
specifying particular component transaction coordination functionality to be leveraged.

15. The computer implemented method of claim 11, wherein generating the agent from the template agent comprises:
selecting a specific template agent from the template agents; and
specifying particular background processing functionality to be leveraged.

16. The computer implemented method of claim 11, wherein template forms and the generated form are configured to present and manage data.

17. The computer implemented method of claim 11, wherein template views and the generated view are configured to present database records.

18. The computer implemented method of claim 11, wherein template shared actions and the generated shared actions are configured to coordinate transactions among different components.

19. The computer implemented method of claim 11, wherein template agents and the generated agents are configured to manage actions running as background processes.

20. A computer implemented method of generating a document management application using a standard application development template comprising:
providing templates configured to provide standard functionality facilitating document management; wherein the templates include front-end templates configured for defining user interface elements of an application under development, the front-end templates including at least template forms, template views and template shared actions and back-end templates configured for defining background processes of the application under development the back-end template including at least one template agent;
receiving a selection of at least one of the front-end templates and at least one of the back-end templates to include in the document management application;
generating an application-specific copy of the selected front-end templates and
back-end templates for the document management application; and
integrating the application-specific copy of the selected front-end templates and back-end templates to the document management application.

21. The computer implemented method of claim 20, wherein generating document management applications using the templates comprises:
receiving user selections of one or more of the front-end templates;
receiving user specifications of project specific functions to be incorporated into the selected one or more front-end templates;
receiving user selections of one or more of the back-end templates; and
receiving user specifications of project specific functions to be incorporated into the selected one or more back- and back-end templates.

22. The computer implemented method of claim 20, wherein the front-end templates include template forms, template views and template shared actions; wherein template forms are used to present and manage data, template views are used to present database records and template shared actions are used to coordinate transactions among different components.

23. The computer implemented method of claim 20, wherein the back-end components include template agents; wherein the template agents are background processes.

* * * * *